US006883206B2

United States Patent
Yang et al.

(10) Patent No.: US 6,883,206 B2
(45) Date of Patent: Apr. 26, 2005

(54) SWIVEL HINGE WITH ANGULAR FIXING STRUCTURE

(75) Inventors: Kuo-Chang Yang, Hsinchu (TW); Jung-Wen Chang, Taoyuan Shien (TW); Wen-Hsiang Chen, Tan Shui (TW)

(73) Assignee: Quanta Computer Inc. (TW)

( * ) Notice: Subject to any disclaimer, the term of this patent is extended or adjusted under 35 U.S.C. 154(b) by 0 days.

(21) Appl. No.: 10/445,835

(22) Filed: May 28, 2003

(65) Prior Publication Data

US 2004/0139578 A1 Jul. 22, 2004

(30) Foreign Application Priority Data

Jan. 16, 2003 (TW) ...................... 92200813 U

(51) Int. Cl.⁷ ............................ E05D 11/08; E05D 3/10
(52) U.S. Cl. ............................ 16/337; 16/339; 16/340; 16/367; 248/917; 361/681
(58) Field of Search .................. 16/337, 339, 340, 16/367; 248/917, 919, 922, 923; 361/680–683

(56) References Cited

U.S. PATENT DOCUMENTS 6,105,919 A * 8/2000 Min ........................ 248/418
6,189,842 B1 * 2/2001 Bergeron Gull et al. . 248/125.1
6,510,049 B1 * 1/2003 Rosen ........................ 361/681
6,587,333 B1 * 7/2003 Tseng et al. ................. 361/681
6,694,570 B1 * 2/2004 Chen ........................... 16/367
6,742,221 B1 * 6/2004 Lu et al. ....................... 16/367

FOREIGN PATENT DOCUMENTS

JP  11257342 A  *  9/1999  ........... F16C/11/10
JP  11272187 A  * 10/1999  ............. G09F/9/00

* cited by examiner

*Primary Examiner*—Chuck Y. Mah
(74) *Attorney, Agent, or Firm*—Rabin & Berdo, P.C.

(57) ABSTRACT

A swivel hinge with angular fixing structure is employed to connect a mainframe and a display means of a notebook computer. The swivel hinge has a fixture part, a fixture friction ring, a rotation part, a rotation friction ring, and an elastic ring. The fixture part mounted on the mainframe has a through hole in the center thereof. The fixture friction ring mounted on the fixture part has at least one holder on the surface. The rotation friction ring mounted on the rotation part has at least one slot in the surface thereof. The elastic ring is located between the fixture part and the fixture friction ring. If the slot and the holder on the friction ring fit into each other, the desired angular fixing function is provided.

12 Claims, 3 Drawing Sheets

SWIVEL HINGE WITH ANGULAR FIXING STRUCTURE

BACKGROUND OF THE INVENTION

1. Field of Invention

The present invention relates to a swivel hinge apparatus. More particularly, the present invention relates to a swivel hinge apparatus with an angular fixing structure for a notebook computer.

2. Description of Related Art

As optical and semiconductor manufacturing technology advances, Liquid Crystal Display (hereafter LCD) is widely used in all kinds of electronic appliances. LCD has several advantages, such as high resolution, small volume, light weight, low driving voltage, low power consumption and broad application. Thus, LCD application has become popular in portable TVs, cellular phones, camcorders, notebook personal computers (PCs), desktop PCs, projectors and other consumer electronics or computer products. LCD has become a mainstream technology in the display market.

Generally speaking, an LCD is secured to an upper cover of a notebook PC. The upper cover can be opened while turning on the notebook PC. An LCD is exposed after opening the upper cover. The upper cover is connected pivotally to a mainframe of the notebook PC. Therefore, The LCD can be adjusted to a desired position by rotating the upper cover in relation to the mainframe.

Because a notebook PC is portable, a user often carries it out of the office to a desired place. In different circumstances, the notebook PC is used for demonstration purposes. However, traditionally, the LCD of notebook PC doesn't have an ability to display information in as large viewing angle as to all of the people around it. Thus, a new model PC entitled Tablet Personal Computer has been introduced to the market. A tablet PC has a 180-degree rotatable LCD panel. A Tablet Personal Computer (hereafter tablet PC) providing both keyboard input and manual input not only changes computer use habits but also creates a milestone for information technology. Moreover, the tablet PC operation systems can provide a manual input function. The tablet PC has accordingly a user-friendly manual input interface and a 180-degree rotatable LCD panel. Therefore, persons around the tablet PC can easily read the information displayed on the LCD by rotating the LCD panel.

The LCD panel's two degrees of rotation function may cause the LCD panel to shake or give rise to other unsteady circumstances. Therefore, a means for angular fixing of the LCD panel after moving the same to a desired position is essential. For the forgoing reasons, there is a need for providing a steady input and display environment.

SUMMARY OF THE INVENTION

It is therefore an objective of the present invention to provide a swivel hinge apparatus with an angular fixing function in order to provide a steady input and display environment.

In accordance with the foregoing and other objectives of the present invention, a swivel hinge with angular fixing structure is employed to connect a mainframe and a display means of a notebook computer. The swivel hinge includes a fixture part, a fixture friction ring, a rotation part, a rotation friction ring, and an elastic ring. The fixture part mounted on the mainframe has a through hole in the center thereof. The fixture friction ring fixed on the fixture part has at least one holder on the surface. The rotation friction ring fixed on the rotation part has at least one slot in the surface thereof. The elastic ring is located between the fixture part and the fixture friction ring. If the slot and the holder on the friction ring fit into each other, the desired angular fixing function is provided.

According to one preferred embodiment of present invention, the rotation part includes a rotation plate and a rotation base. The rotation plate connects to the rotation base via the through hole of the fixture part. That is, the fixture part is placed between the rotation plate and the rotation base.

According to one preferred embodiment of present invention, the fixture friction ring alternatively has at least one slot, and the rotation friction ring alternatively has at least one holder. If the holder and the slot fit each other, the desired angular fixing function is provided. The elastic ring can be disposed between the rotation friction ring and the rotation part, or be disposed between the fixture friction ring and the fixture part. But the elastic ring cannot be disposed between the fixture friction ring and the rotation friction ring.

In conclusion, the swivel hinge apparatus of present can provide not only a multi-angle fixing function but also a steady input and display environment for users.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
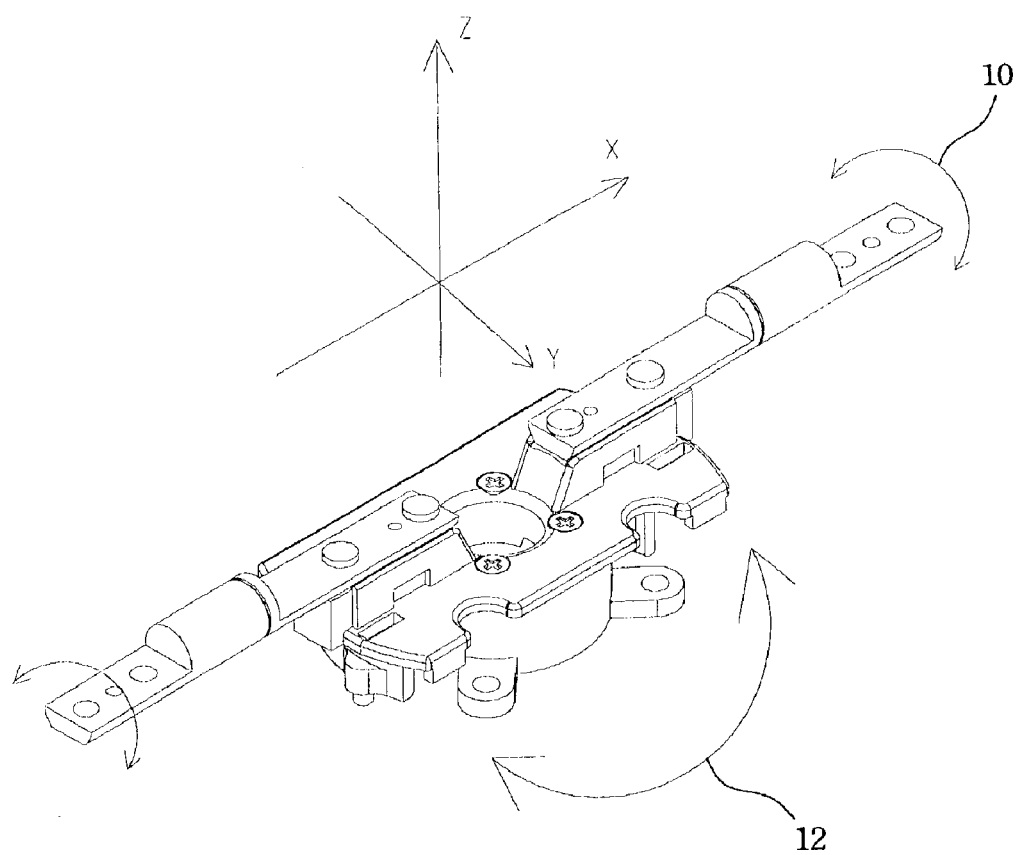
FIG. 1 illustrates a perspective view of a swivel hinge apparatus according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a perspective view of a swivel hinge apparatus according to one preferred embodiment of this invention. The swivel hinge apparatus of the present invention has two rotational degrees of freedom. A rotation direction 10 indicates rotation around the X-axis. A LCD panel is opened and closed in the rotation direction 10. A rotation direction 12 indicates rotation around the Z-axis. A LCD panel's display view can be adjusted in the rotation direction 12. The purpose of present invention is to provide an angular fixing function. The detailed structure of the swivel hinge apparatus is described below.

Figure 2:
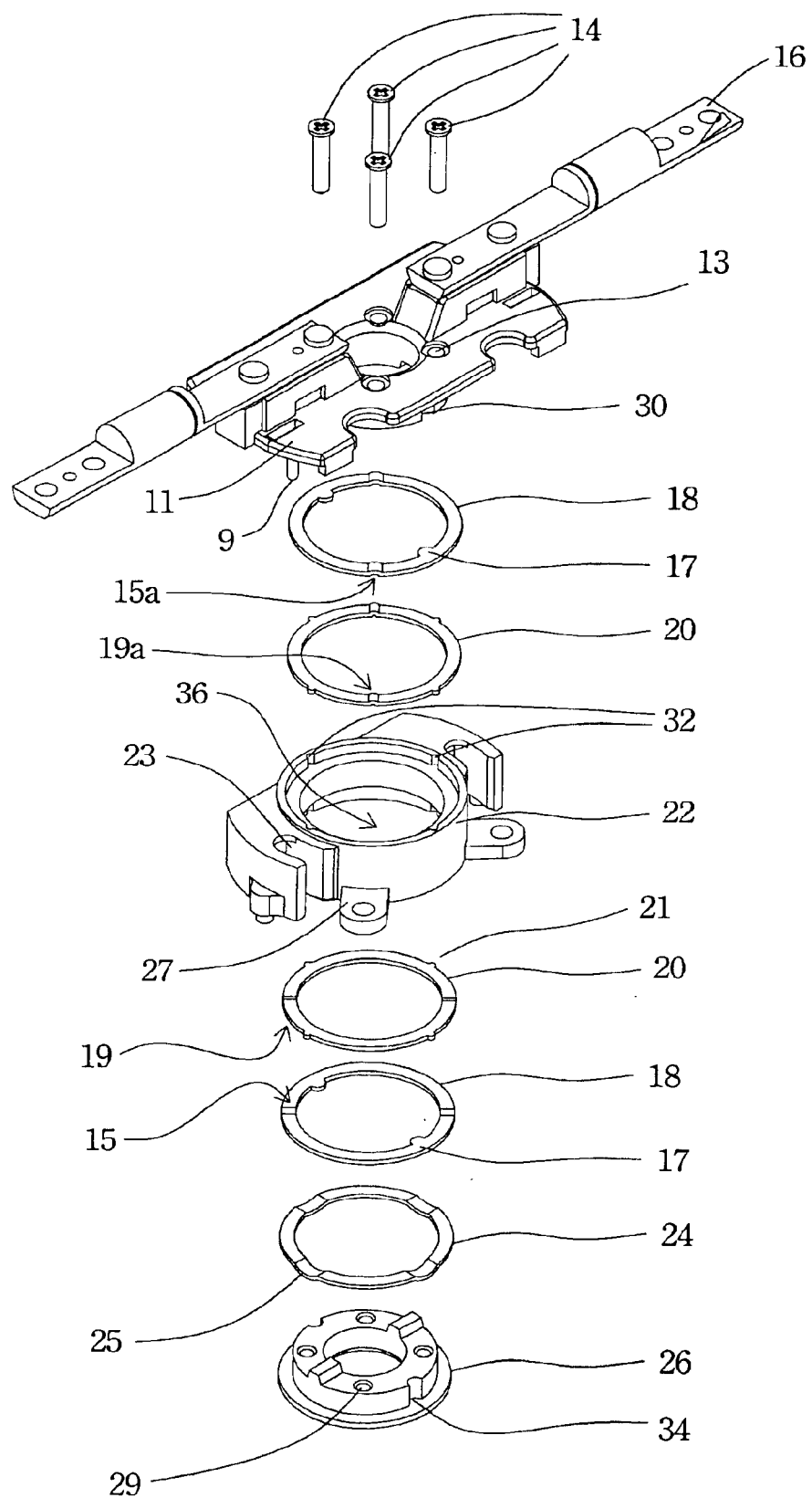
FIG. 2 illustrates an exploded view of a swivel hinge apparatus according to one preferred embodiment of this invention.

FIG. 2 illustrates an exploded view of a swivel hinge apparatus according to one preferred embodiment of this invention. The swivel hinge apparatus includes an X axis hinge 16, a rotation plate 11, a fixture friction ring 20, a rotation friction ring 18, a fixture part 22, an elastic ring 24 and a rotation base 26. The fixture part 22 is fixed to a mainframe of a notebook PC by fastening via screw holes 27. The X-axis hinge 16, mounted on the rotation plate 11, is employed to connect to a display means of a notebook computer. The rotation plate 11 is fixed to the rotation base 26 by bolts. A combination of the rotation plate 11 and the rotation base 26 is docked inside the fixture part 22 and the combination can rotate in relation to the fixture part 22. For example, the rotation plate 11 and the rotation base 26 are fixed by fastening screws 14 to holes 29 via holes 13 and the through hole 36. The rotation plate 11 and the rotation base 26 rotate simultaneously in relation to the fixture part 22.

Referring to FIG. 2, several round rings between the fixture part 22 and the rotation parts (including a rotation plate 11 and a rotation base 26) are employed to conduct angular fixing function. The fixture friction ring 20 (such as a circular ring) is fixed to the fixture part 22 by fitting a holder 21 of the fixture friction ring 20 to a slot 32 of the fixture part 22. That is, the fixture part 22 and fixture friction ring 20 rotate simultaneously.

Figure 3A:
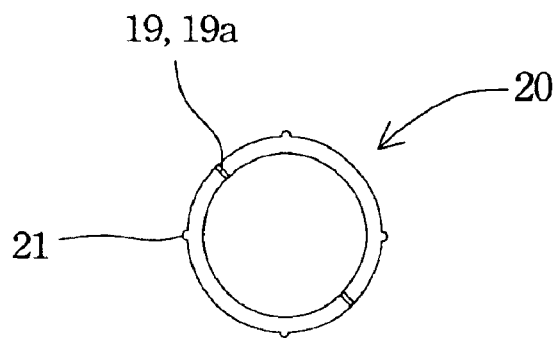
FIG. 3A illustrates a perspective view of a rotation friction ring according to another preferred embodiment of this invention.
Figure 3B:
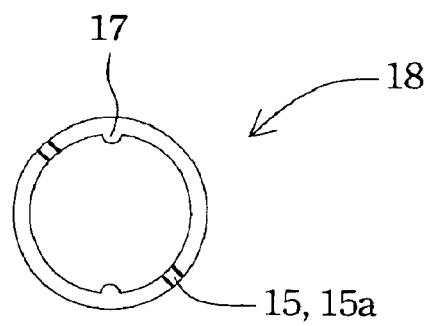
FIG. 3B illustrates a perspective view of a fixture friction ring according to another preferred embodiment of this invention.

Referring FIG. 2 again, a rotation friction ring 18 is a corresponding component of the fixture friction ring 20. The rotation friction ring 18 (such as a circular ring) is fixed to the rotation part (such as the rotation plate 11 and the rotation base 26) by respectively fitting a holder 17 of the rotation friction ring 18 to a slot 30 of the rotation plate 11 and/or to a slot 34 of the rotation base 26. Namely, the rotation friction ring 18 is fixed to a rotation plate 11 and/or a rotation base 26. In other words, the rotation friction ring 18 and the rotation part can rotate simultaneously The Z-axis hinge's angular fixing function is conducted by fitting position elements (15 and 15a, 19 and 19a) respectively on the fixture friction ring and the rotation friction ring together. Referring FIG. 3A, 3B and 2, an angular fixing function is provided if a second position element 15 and 15a on the rotation friction ring 18 is fitted into a first position element 19 and 19a on the fixture friction ring 20. The first position element 19 and 19a described above can be a holder (a convex member), and the second position element 15 and 15a can be a slot (a concave portion). Because the rotation friction ring 18 and the fixture friction ring 20 are corresponding components, the position elements (a holder or a slot) on the friction rings 18 or 20 can be replaced by each other. That is, the holder (convex member) and the slot (concave portion) can be respectively designed on the fixture friction ring and the rotation friction ring, or can be respectively designed on the rotation friction ring and the fixture friction ring. The desired angular fixing numbers can be decided by how many position elements (holders and slots) on the friction rings. For example, if an interval between two position elements in a circular friction ring is 180 degrees, there will be two angular fixing positions in the circular friction ring. If an interval between two position elements in a circular friction ring is 90 degrees, there will be four angular fixing positions in the circular friction ring.

In addition, in order to provide desired angular fixing positions on the circular friction ring, the position element can be made in specific positions. For example, the position elements can be made at 0 degrees, 90 degrees, and 180 degrees of the circular friction ring, resulting in an angular fixing function of 0 degrees, 90 degrees, and 180 s provided around the Z axis.

Figure 3C:
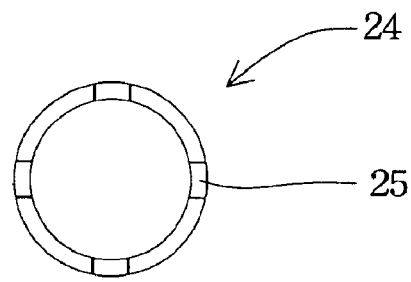
FIG. 3C illustrates a perspective view of an elastic ring according to another preferred embodiment of this invention.

In one preferred embodiment of present invention, an elastic ring can be added in a swivel hinge apparatus to provide steady angular fixing function. For example (referring to FIG. 2), an elastic ring 24 is disposed between the rotation friction ring 18 and the rotation base 26. Referring FIGS. 3C and 2, the elastic ring 24 includes a spring ring, a plastic elastic ring, and a metal elastic ring, such as a circular wavy elastic ring. The elastic ring 24 can provide axial pushing forces such that the holder and the slot can fit firmly. The position of the elastic ring 24 can be disposed between the rotation friction ring 18 and the rotation part 26, or can be disposed between the fixture friction ring 20 and the fixture part 22, but the position of the elastic ring cannot be disposed between the rotation friction ring 18 and the fixture friction ring 20.

Referring to FIG. 2, a through hole 36 in the center of a swivel hinge apparatus provides a space for message lines and power lines layout. These message lines and power lines are employed to provide power and to communicate messages. A swivel hinge apparatus can rotate clockwise or counter-clockwise. However, a rotation range of a swivel hinge apparatus needs to be limited to avoid power line breakage because of twisting.

For example (referring FIG. 2), pin holders 23 are respectively installed on two sides of the fixture part 22 and corresponding pins 9 are under the rotation plate 11. The pin holders 23 are employed to block the range of motion of the pins 9 such that the rotation plate 11 rotates within a predetermined rotation direction and range. In one preferred embodiment of present invention, the swivel hinge apparatus can provide a rotation range of 180 degrees around the Z-axis.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A swivel hinge apparatus with angular fixing function employed to connect a mainframe and a display means of a notebook computer, said swivel hinge apparatus comprising:

a fixture part, fastened to said mainframe, said fixture part having a through part in a center thereof;

a fixture friction ring, fixed to said fixture part and having at least one convex member;

a rotation part fixed to said display means, wherein said rotation part connects to said fixture part, and said fixture friction ring is disposed between said fixture part and said rotation part;

a rotation friction ring, fixed to said rotation part, having at least one concave portion, wherein said rotation friction ring is disposed between said fixture friction ring and said rotation part, and said rotation friction ring contacts said fixture friction ring; and at least one elastic ring, disposed between said rotation part and said fixture part, wherein a combination of said rotation part and said fixture part provides one degree of rotation function and said swivel hinge apparatus provides an angular fixing function when said convex member fits into said concave portion.

2. The swivel hinge apparatus of claim 1, wherein said elastic ring is disposed between said fixture part and said fixture friction ring.

3. The swivel hinge apparatus of claim 1, wherein said elastic ring is disposed between said rotation part and said rotation friction ring.

4. The swivel hinge apparatus of claim 1, wherein said rotation part further comprises a hinge to connect to said display means.

5. The swivel hinge apparatus of claim 1, wherein said rotation part further comprises a rotation plate and a rotation base.

6. The swivel hinge apparatus of claim 5, wherein said rotation plate connects to said rotation base via said through part of said fixture part, and said fixture part is placed between said rotation plate and connects to said rotation base.

7. The swivel hinge apparatus of claim 5, wherein said rotation plate further comprises a hinge to connect to said display means.

8. The swivel hinge apparatus of claim 5, wherein said rotation plate further comprises a pin, and said fixture part has at least one corresponding pin holder, wherein said corresponding holder limits said pin such that said fixture part can rotate within a predetermined rotation range.

9. A swivel hinge apparatus with angular fixing function employed to connect a mainframe and a display means of a notebook computer, said swivel hinge apparatus comprising:

a fixture part, fastened to said mainframe, said fixture part having a through part in a center thereof;

two fixture friction rings, respectively fixed to said fixture part, wherein each of said fixture friction rings has at least one convex member;

a rotation plate, fixed to said display means, said rotation plate connecting to said fixture part, wherein one of said fixture friction rings is disposed between said fixture part and said rotation plate;

a rotation base, connected to said rotation plate via said through part of said fixture part, wherein the other of said fixture friction rings is disposed between said fixture part and said rotation base;

two rotation friction rings, respectively fixed to said rotation plate and said rotation base, wherein each of said rotation friction rings has at least one concave portion, one of said rotation friction rings is disposed between one of said fixture friction rings and said rotation plate, one of said rotation friction rings contacts one of said fixture friction rings, the other of said rotation friction rings is disposed between the other of said fixture friction rings and said rotation base, and the other of said rotation friction rings contacts the other of said fixture friction rings; and at least one elastic ring, disposed between said rotation base and said fixture part or between said rotation plate and said fixture part, wherein a combination of said rotation plate, said fixture part and said rotation base provides one degree of rotation function, and said swivel hinge apparatus provides an angular fixing function when said convex member fits into said concave portion.

10. The swivel hinge apparatus of claim 9, wherein said rotation plate further comprises a hinge to connect to said display means.

11. The swivel hinge apparatus of claim 9, wherein said rotation plate further comprises a pin and said fixture part has at least one corresponding pin holder, wherein said corresponding holder limits said pin such that said fixture part rotates within a predetermined rotation range.

12. A swivel hinge apparatus with angular fixing function employed to connect a mainframe and a display means of a notebook computer, said swivel hinge apparatus comprising:

a fixture part, fastened to said mainframe, said fixture part having a through part in a center thereof;

a fixture friction ring, fixed to said fixture part and having at least one concave portion;

a rotation part fixed to said display means, wherein said rotation part connects to said fixture part, and said fixture friction ring is disposed between said fixture part and said rotation part;

a rotation friction ring, fixed to said rotation part, having at least one convex member, wherein said rotation friction ring is disposed between said fixture friction ring and said rotation part, and said rotation friction ring contacts said fixture friction ring; and at least one elastic ring, disposed between said rotation part and said fixture part, wherein a combination of said rotation part and said fixture part provides one degree of rotation function and said swivel hinge apparatus provides an angular fixing function when said convex member fits said concave portion.

* * * * *